(12) United States Patent
Inomata et al.

(10) Patent No.: US 10,176,922 B2
(45) Date of Patent: Jan. 8, 2019

(54) MULTILAYER CERAMIC CAPACITOR

(71) Applicant: TAIYO YUDEN CO., LTD., Taito-ku, Tokyo (JP)

(72) Inventors: Yasuyuki Inomata, Takasaki (JP); Shintaro Hayashi, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/416,892

(22) Filed: Jan. 26, 2017

(65) Prior Publication Data

US 2017/0221634 A1    Aug. 3, 2017

(30) Foreign Application Priority Data

Jan. 28, 2016  (JP) ................. 2016-014670

(51) Int. Cl.
| | |
|---|---|
| *H01G 4/01* | (2006.01) |
| *H01G 4/12* | (2006.01) |
| *H01G 4/30* | (2006.01) |
| *H01G 4/232* | (2006.01) |
| *H01G 4/242* | (2006.01) |

(52) U.S. Cl.
CPC ............. *H01G 4/30* (2013.01); *H01G 4/01* (2013.01); *H01G 4/12* (2013.01); *H01G 4/232* (2013.01); *H01G 4/242* (2013.01)

(58) Field of Classification Search
CPC .. H01G 4/30; H01G 4/01; H01G 4/12; H01G 4/232; H01G 4/242
USPC ...................................... 361/301.4
See application file for complete search history.

(56) References Cited

U.S. PATENT DOCUMENTS

| | | | | |
|---|---|---|---|---|
| 2007/0058326 A1* | 3/2007 | Hidaka | ................... | H01G 4/12 361/311 |
| 2009/0015986 A1* | 1/2009 | Togashi | ................. | H01G 4/012 361/321.4 |
| 2013/0100576 A1* | 4/2013 | Seo | ......................... | H01G 4/30 361/301.4 |
| 2013/0250473 A1* | 9/2013 | Bultitude | ................. | H01G 4/30 361/301.4 |

FOREIGN PATENT DOCUMENTS

JP          H08037126 A     2/1996

* cited by examiner

*Primary Examiner* — Michael P McFadden
(74) *Attorney, Agent, or Firm* — Law Office of Katsuhiro Arai (57) ABSTRACT

In an embodiment, a multilayer ceramic capacitor 10 is constituted in such a way that four capacitive components C1 to C4 that are connected in series are formed between a first internal electrode layer group 14 and a second internal electrode layer group 15 adjacent to it, wherein, among the four capacitive components C1 to C4, the facing area Sc1 that defines the capacitance value of the capacitive component C1 closest to the first external electrode 12 and the facing area Sc4 that defines the capacitance value of the capacitive component C4 closest to the second external electrode 13 are greater than the facing areas Sc2 and Sc3 that define the capacitance values of the two remaining capacitive components C2 and C3, respectively. The multilayer ceramic capacitor is capable of satisfying the needs for both size reduction and voltage resistance increase.

6 Claims, 4 Drawing Sheets

MULTILAYER CERAMIC CAPACITOR

BACKGROUND

Field of the Invention

The present invention relates to a multilayer ceramic capacitor capable of accommodating high voltage.

Description of the Related Art

Pertaining to multilayer ceramic capacitors capable of accommodating high voltage, FIG. 1 and FIG. 2 of Patent Literature 1 mentioned later disclose a multilayer ceramic capacitor constituted by first internal electrode layer groups and second internal electrode layer groups stacked alternately with dielectric layers in between, wherein four or more capacitive components that are connected in series are formed between a first internal electrode layer group and a second internal electrode layer group adjacent to it. This multilayer ceramic capacitor can effectively improve voltage resistance because the high voltage applied between its first external electrode and second external electrode can be divided to each of the four or more capacitive components connected in series.

Regarding to multilayer ceramic capacitors capable of accommodating high voltage, they are facing a need for greater voltage resistance in addition to size reduction, just like other general multilayer ceramic capacitors. However, reducing the size of the multilayer ceramic capacitor disclosed in Patent Literature 1 below, especially shortening its length, makes it easier for a discharge phenomenon to occur between the first external electrode and the capacitive component closest to it, and also between the second external electrode and the capacitive component closest to it when high voltage is applied between the first external electrode and second external electrode. In other words, size reduction tends to lower the discharge-starting voltage, which makes it difficult to increase voltage resistance.

BACKGROUND ART LITERATURES

[Patent Literature 1] Japanese Patent Laid-open No. Hei 08-037126

SUMMARY

An object of the present invention is to provide a multilayer ceramic capacitor capable of contributing to both size reduction and voltage resistance increase.

Any discussion of problems and solutions involved in the related art has been included in this disclosure solely for the purposes of providing a context for the present invention, and should not be taken as an admission that any or all of the discussion were known at the time the invention was made.

To achieve the aforementioned object, the multilayer ceramic capacitor pertaining to the present invention is a multilayer ceramic capacitor constructed by stacking alternately, with dielectric layers placed in between: first internal electrode layer groups, each comprising a first electrode layer connected to a first external electrode, a second electrode layer connected to a second external electrode, and n number (n is an integer of 1 or greater) of third electrode layer(s) placed between the first electrode layer and second electrode layer in a manner not contacting either of them; and second internal electrode layer groups, each comprising n+1 number of fourth electrode layers not connected to either the first external electrode or the second external electrode, being placed in a manner not contacting each other; wherein m number (m is an even number of 4 or greater) of capacitive components that are connected in series are formed between the first internal electrode layer group and the second internal electrode layer group adjacent to it; and among the m number of capacitive components, the facing area that defines the capacitance value of one capacitive component closest to the first external electrode, and the facing area that defines the capacitance value of one capacitive component closest to the second external electrode, are each greater than the facing area that defines the capacitance value of any of the remaining capacitive components.

According to the present invention, a multilayer ceramic capacitor capable of contributing to both size reduction and voltage resistance increase can be provided.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

FIG. 1A is a longitudinal section view of a multilayer ceramic capacitor pertaining to the first embodiment of the present invention, while

FIG. 6A is a longitudinal section view of a multilayer ceramic capacitor pertaining to the second embodiment of the present invention, while

FIG. 7A is a longitudinal section view of a multilayer ceramic capacitor pertaining to the third embodiment of the present invention, while

DESCRIPTION OF THE SYMBOLS

10—Multilayer ceramic capacitor, 11—Capacitor body, 12—First external electrode, 13—Second external electrode, 14, 14-1, 14-2—First internal electrode layer group, 14a—First electrode layer, 14b—Second electrode layer, 14c, 14c-1, 14c-2—Third electrode layer, 15, 15-1, 15-2—Second internal electrode layer group, 15a, 15a-1, 15a-2—Fourth electrode layer, C1 to C4—Capacitive component, Sc1 to Sc4—Facing area, 20—Multilayer ceramic capacitor, 21—Capacitor body, 22—First external electrode, 23—Second external electrode, 24—First internal electrode layer group, 24a—First electrode layer, 24b—Second electrode layer, 24c—Third electrode layer, 25—Second internal electrode layer group, 25a—Fourth electrode layer, C1 to C6—Capacitive component, Sc1 to Sc6—Facing area, 30—Multilayer ceramic capacitor, 31—Capacitor body, 32—First external electrode, 33—Second external electrode, 34—First internal electrode layer group, 34a—First electrode layer, 34b—Second electrode layer, 34c—Third electrode layer, 35—Second internal electrode layer group, 35a—Fourth electrode layer, C1 to C6—Capacitive component, Sc1 to Sc6—Facing area

DETAILED DESCRIPTION OF EMBODIMENTS

<<First Embodiment>>

Figure 1A:
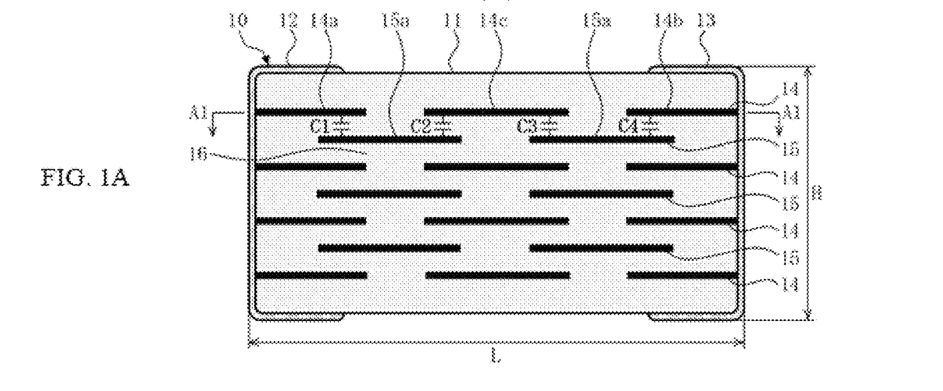
Figure 1B:
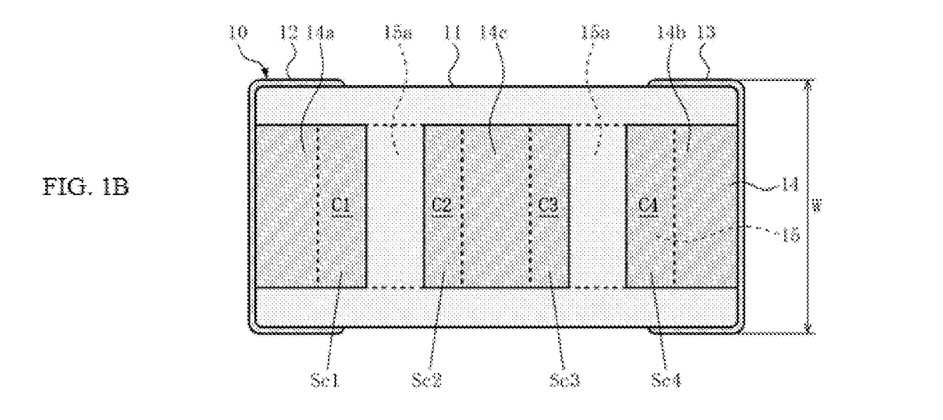
FIG. 1B is a lateral section view of the multilayer ceramic capacitor along line A1-A1 in FIG. 1A.

First, a multilayer ceramic capacitor 10 pertaining to the first embodiment of the present invention is explained using FIGS. 1A and 1B.

It should be noted that, while FIGS. 1A and 1B describe a multilayer ceramic capacitor 10 whose length L, width W, and height H as explained below conform to the relationship of "Length L>Width W=Height H," the length L, width W, and height H can have the relationship of "Length L>Width W>Height H" or "Length L>Height H>Width W." Also, while the numbers of the below-explained first internal electrode layer groups 14, second internal electrode layer groups 15 and dielectric layers 16 drawn are 4, 3, and 6, respectively, these are merely for the purpose of illustration and the number of first internal electrode layer groups 14 can be 5 or more or 3 or less, and the number of second internal electrode layer groups 15 can be 4 or more or 2 or less.

The multilayer ceramic capacitor 10 constitutes a roughly rectangular solid shape having length L, width W, and height H. This multilayer ceramic capacitor 10 has: a capacitor body 11 of roughly rectangular shape whose length, width, and height are slightly smaller than the length L, width W, and height H; a first external electrode 12 that continuously covers one length-direction face (left face in the figure), parts of both width-direction faces, and parts of both height-direction faces, of the capacitor body 11; and a second external electrode 13 that continuously covers the other length-direction face (right face in the figure), parts of both width-direction faces, and parts of both height-direction faces, of the capacitor body 11. Although not illustrated, the first external electrode 12 and second external electrode 13 each have a two-layer structure constituted by a base film contacting the exterior surface of the capacitor body 11 and a surface film contacting the exterior surface of this base film, or a multi-layer structure constituted by a base film, a surface film, and at least one intermediate film in between.

The capacitor body 11 has a built-in capacitive part (not accompanied by symbol) constituted by four first internal electrode layer groups 14 and three second internal electrode layer groups 15 stacked alternately with dielectric layers 16 in between, and dielectric margin parts (not accompanied by symbol) are provided in a manner covering both sides of the capacitive part in the width direction and in the height direction. The six dielectric layers 16 have an equal thickness, and the thickness of each dielectric layer 16 is roughly uniform.

Each first internal electrode layer group 14 is constituted by: a first electrode layer 14a of rectangular profile whose exposed part on one length-direction face (left face in the figure) of the capacitor body 11 is connected to the first external electrode 12; a second electrode layer 14b of rectangular profile whose exposed part on the other length-direction face (right face in the figure) of the capacitor body 11 is connected to the second external electrode 13; and one third electrode layer 14c of rectangular profile which is placed between the first electrode layer 14a and second electrode layer 14b in a manner not contacting either of them. The thickness and width of the first electrode layer 14a, thickness and width of the second electrode layer 14b, and thickness and width of the third electrode layer 14c, are respectively equal.

Each second internal electrode layer group 15 is not connected to either the first external electrode 12 or the second external electrode 13, and is constituted by two fourth electrode layers 15a of rectangular profile which are placed in a manner not contacting each other. The two fourth electrode layers 15a each have an equal thickness and width, where the width of each fourth electrode layer 15a is equal to the width of the first electrode layer 14a, that of the second electrode layer 14b, and that of the third electrode layer 14c.

As shown in FIGS. 1A and 1B, where a first internal electrode layer group 14 and a second internal electrode layer group 15 adjacent to it are concerned, the right edge of the first electrode layer 14a faces the left edge of the left fourth electrode layer 15a via a dielectric layer 16. Also, the right edge of the left fourth electrode layer 15a faces the left edge of the third electrode layer 14c via a dielectric layer 16. Furthermore, the right edge of the third electrode layer 14c faces the left edge of the right fourth electrode layer 15a via a dielectric layer 16. Furthermore, the right edge of the right fourth electrode layer 15a faces the left edge of the second electrode layer 14b via a dielectric layer 16. In other words, the adjacent first internal electrode layer group 14 and second internal electrode layer group 15 are constituted in such a way that four capacitive components C1 to C4 that are connected in series are formed between them.

In addition, because the dielectric layers 16 each have a roughly uniform thickness, the four capacitive components C1 to C4 have capacitance values that are proportional to the facing areas Sc1 to Sc4, respectively. To be specific, among the four capacitive components C1 to C4, the facing area Sc1 that defines the capacitance value of the capacitive component C1 is equal to the facing area Sc4 that defines the capacitance value of the capacitive component C4. Also, the facing area Sc2 that defines the capacitance value of the capacitive component C2 is equal to the facing area Sc3 that defines the capacitance value of the capacitive component C3. However, the facing areas Sc1 and Sc4 are greater than the facing areas Sc2 and Sc3. This means that, among the four capacitive components C1 to C4, the facing area Sc1 that defines the capacitance value of the capacitive component C1 closest to the first external electrode 12 and the facing area Sc4 that defines the capacitance value of the capacitive component C4 closest to the second external electrode 13 are greater than the facing areas Sc2 and Sc3 that define the capacitance values of the remaining two capacitive components C2 and C3, respectively.

It should be noted that, while the facing area Sc1 is equal to the facing area Sc4 and the facing area Sc2 is equal to the facing area Sc3 in FIGS. 1A and 1B, the facing area Sc1 may be different from the facing area Sc4 and the facing area Sc2 may be different from the facing area Sc3, so long as the facing areas Sc1 and Sc4 are greater than the facing areas Sc2 and Sc3.

As supplemental features of the materials, etc., preferably a dielectric ceramic whose primary component is barium titanate, strontium titanate, calcium titanate, magnesium titanate, calcium zirconate, calcium titanate zirconate, barium zirconate, titanium oxide, etc., or more preferably a dielectric ceramic of $\varepsilon > 1000$ or Class 2 (high dielectric constant type), can be used for the capacitor body 11, excluding the first internal electrode layer groups 14 and second internal electrode layer groups 15.

Also, preferably a good conductor whose primary component is nickel, copper, palladium, platinum, silver, gold, or any alloy thereof, etc., can be used for the first electrode layer 14a, second electrode layer 14b, and third electrode layer 14c constituting each first internal electrode layer group 14, and also for the two fourth electrode layers 15a constituting each second internal electrode layer group 15.

Furthermore, the base film of the first external electrode 12 and that of the second external electrode 13 are each constituted by a baked film, for example, and for this baked film, preferably a good conductor whose primary component is nickel, copper, palladium, platinum, silver, gold, or any alloy thereof, etc., can be used. The surface film is constituted by a plated film, for example, and for this plated film, preferably a good conductor whose primary component is copper, tin, palladium, gold, zinc, or any alloy thereof, etc., can be used. The intermediate film is constituted by a plated film, for example, and for this plated film, preferably a good conductor whose primary component is platinum, palladium, gold, copper, nickel, or any alloy thereof, etc., can be used.

Next, a preferable example of how the multilayer ceramic capacitor 10 is manufactured is explained by referencing the symbols in FIGS. 1A and 1B as deemed appropriate.

For the manufacture, a ceramic slurry containing dielectric ceramic powder, and an electrode paste containing good conductor powder, are prepared. Next, the ceramic slurry is coated on the surfaces of carrier films and dried to prepare first green sheets. Also, the electrode paste is printed on the surface of a first green sheet and dried, to prepare a second green sheet on which matrix patterns corresponding to the first internal electrode layer group 14 are formed. Furthermore, the electrode paste is printed on the surface of a first green sheet and dried, to prepare a third green sheet on which matrix patterns corresponding to the second internal electrode layer group 15 are formed.

Next, a specified number of unit sheets cut out from the first green sheet are stacked and thermally bonded one by one to prepare an area corresponding to one margin part in the height direction. Also, a specified number of unit sheets cut out from the second green sheet (including pattern groups) and a specified number of unit sheets cut out from the third green sheet (including pattern groups) are stacked alternately and thermally bonded one by one to prepare an area corresponding to the capacitive part. Furthermore, a specified number of unit sheets cut out from the first green sheet are stacked and thermally bonded one by one to prepare an area corresponding to the other margin part in the height direction. Finally, the entire stacked sheets are thermally bonded for one last time to prepare an unsintered laminated sheet.

Next, the unsintered laminated sheet is cut to a grid to prepare unsintered chips corresponding to the capacitor body 11. Next, the multiple unsintered chips are sintered all at once (the process includes binder removal and sintering) in an ambience and according to a temperature profile appropriate for the dielectric ceramic powder contained in the ceramic slurry and the good conductor powder contained in the electrode paste, to prepare sintered chips. Next, the multiple sintered chips are subjected to barrel polishing all at once to round their corners and ridge lines, to prepare capacitor bodies 11.

Next, an electrode paste (same as the aforementioned electrode paste or a different electrode paste containing a different type of good conductor powder) is dip-coated or otherwise applied on both ends of the capacitor body 11 in the length direction and dried, followed by baking, to form base films for first external electrode 12 and second external electrode 13, respectively. Next, surface films covering the base films, or intermediate films and surface films, are formed by means of plating, to prepare a first external electrode 12 and a second external electrode 13, respectively.

Next, the effects achieved by the multilayer ceramic capacitor 10 are explained.

(1) The multilayer ceramic capacitor 10 is constituted in such a way that four capacitive components C1 to C4 that are connected in series are formed between a first internal electrode layer group 14 and a second internal electrode layer group 15 adjacent to it, wherein, among the four capacitive components C1 to C4, the facing area Sc1 that defines the capacitance value of the capacitive component C1 closest to the first external electrode 12 and the facing area Sc4 that defines the capacitance value of the capacitive component C4 closest to the second external electrode 13 are greater than the facing areas Sc2 and Sc3 that define the capacitance values of the two remaining capacitive components C2 and C3, respectively. In other words, when high voltage is applied between the first external electrode 12 and second external electrode 13, the partial voltages applied to the capacitive components C1 and C4 become lower than the partial voltages applied to the capacitive components C2 and C3, which means that, even when the multilayer ceramic capacitor 10 is reduced in size, especially when its length is shortened, occurrence of discharge phenomenon between the first external electrode 12 and the capacitive component C1 closest to it, and between the second external electrode 13 and the capacitive component C4 closest to it, can be suppressed, which contributes to both size reduction and voltage resistance increase.

(2) With the multilayer ceramic capacitor 10, the facing area Sc1 that defines the capacitance value of the capacitive component C1 closest to the first external electrode 12 is equal to the facing area Sc4 that defines the capacitance value of the capacitive component C4 closest to the second external electrode 13. In other words, when high voltage is applied between the first external electrode 12 and second external electrode 13, the partial voltage applied to the capacitive component C1 becomes equal to the partial voltage applied to the capacitive component C4, which means that the discharge-starting voltage on the capacitive component C1 side can be matched to the discharge-starting voltage on the capacitive component C4 side to the extent possible to contribute to the unification of discharge-starting voltages.

Next, the results of verifying the aforementioned effects, especially the voltage resistance increase, are explained.

For verification, 100 evaluation samples corresponding to the multilayer ceramic capacitor 10, and 100 comparison samples not corresponding to the multilayer ceramic capacitor 10, were manufactured according to the aforementioned manufacturing example. The specifications of the evaluation sample and that of the comparison sample are as follows. It should be noted that the specification values are all design reference values and do not include manufacturing tolerance.

<Specification of Evaluation Sample (Symbols are Taken from FIGS. 1A and 1B.)>

4500 µm long, 3200 µm wide and 2000 µm high.

Barium titanium is the primary component of the capacitor body 11, excluding the first internal electrode layer groups 14 and second internal electrode layer groups 15; each dielectric layer 16 is 40 µm thick; and the margin parts on both sides in the width direction and on both sides in the height direction are 400 µm thick and 350 µm thick, respectively.

The first external electrode 12 and second external electrode 13 each have a three-layer structure comprising a base film whose primary component is copper and thickness is 50 µm, an intermediate film whose primary component is nickel and thickness is 1.5 µm, and a surface layer whose primary component is tin and thickness is 2 µm.

There are 15 first internal electrode layer groups 14, where the first electrode layer 14a, second electrode layer 14b, and third electrode layer 14c each have a primary component of nickel and thickness of 1 µm, and the first electrode layer 14a and second electrode layer 14b are each 1030 µm long and 2400 µm wide, while the third electrode layer 14c is 1530 µm long and 2400 µm wide.

There are 14 second internal electrode layer groups 15, where the two fourth electrode layers 15a each have a primary component of nickel and thickness of 1 µm, and the two fourth electrode layers 15a are each 1700 µm long and 2400 µm wide.

The facing area Sc1 and facing area Sc4 are each 1.728 mm$^2$, while the facing area Sc2 and facing area Sc3 are each 1.368 mm$^2$.

<Specifications of Comparison Sample (Symbols are Taken from FIGS. 1A and 1B.)>

The facing areas Sc1 to Sc4 are each 1.534 mm$^2$.

Others are the same as with the evaluation sample.

The verification method involved measuring the discharge-starting voltage on each of the 100 evaluation samples and 100 comparison samples, and then obtaining the average discharge-starting voltage of the 100 evaluation samples and the average discharge-starting voltage of the 100 comparison samples. It should be noted that the measurement of discharge-starting voltage was conducted using the DC voltage resistance tester by Kikusui Electronics (TOS9213AS), in air (25° C.) under the conditions of 100 V/s of step-up voltage and 1 mA of threshold, with each sample pinched between the probe terminals. As a result, the average discharge-starting voltage of the 100 evaluation samples was 5.0 kV, while the average discharge-starting voltage of the 100 comparison samples was 3.5 kV, confirming that the evaluation samples had higher voltage resistance, by 1.5 kV, than the comparison samples.

It was also confirmed, from the specifications of samples manufactured together with the evaluation samples, that, when the facing area Sc1 is equal to the facing area Sc4 and the facing area Sc2 is equal to the facing area Sc3, making the facing areas Sc1 and Sc4 1.1 to 1.4 times larger than the facing areas Sc2 and Sc3 would be useful in increasing voltage resistance as mentioned above, while it would cause little change in the total capacitance.

Figure 2:
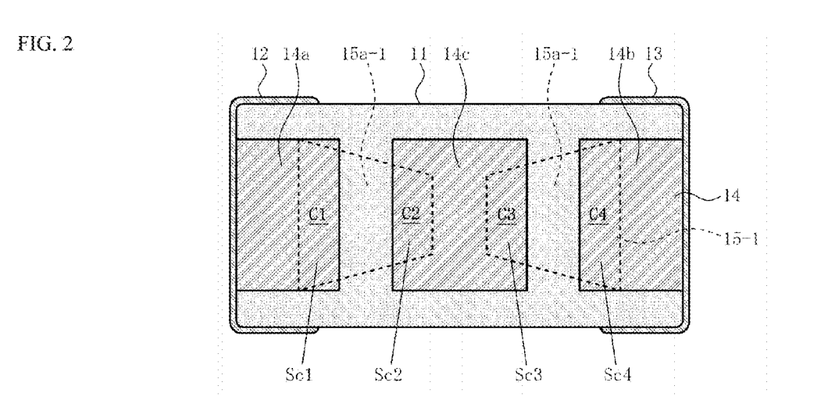
FIG. 2 is a drawing corresponding to FIG. 1B, illustrating the first example of variation of the multilayer ceramic capacitor shown in FIGS. 1A and 1B.
Figure 3:
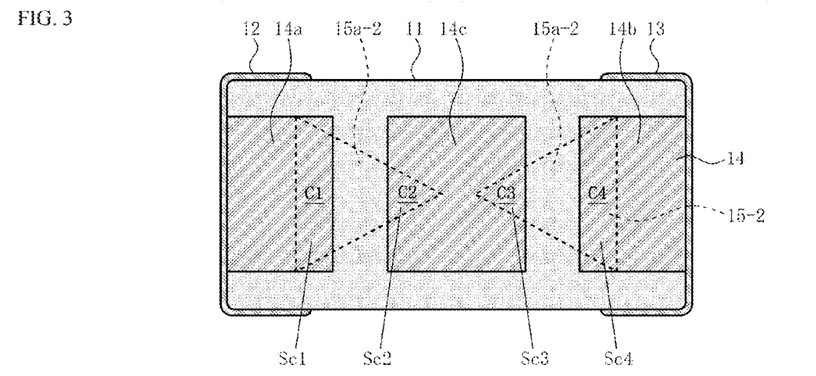
FIG. 3 is a drawing corresponding to FIG. 1B, illustrating the second example of variation of the multilayer ceramic capacitor shown in FIGS. 1A and 1B.
Figure 4:
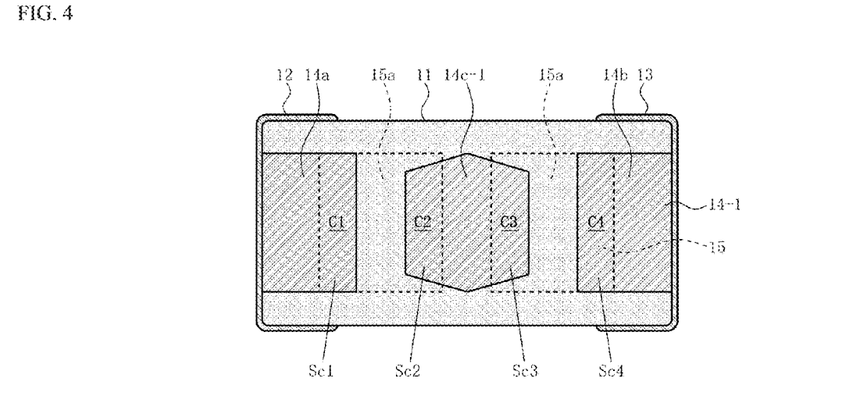
FIG. 4 is a drawing corresponding to FIG. 1B, illustrating the third example of variation of the multilayer ceramic capacitor shown in FIGS. 1A and 1B.

Next, FIGS. 2 to 4 are used to explain examples of variation of the multilayer ceramic capacitor 10.

Figure 5:
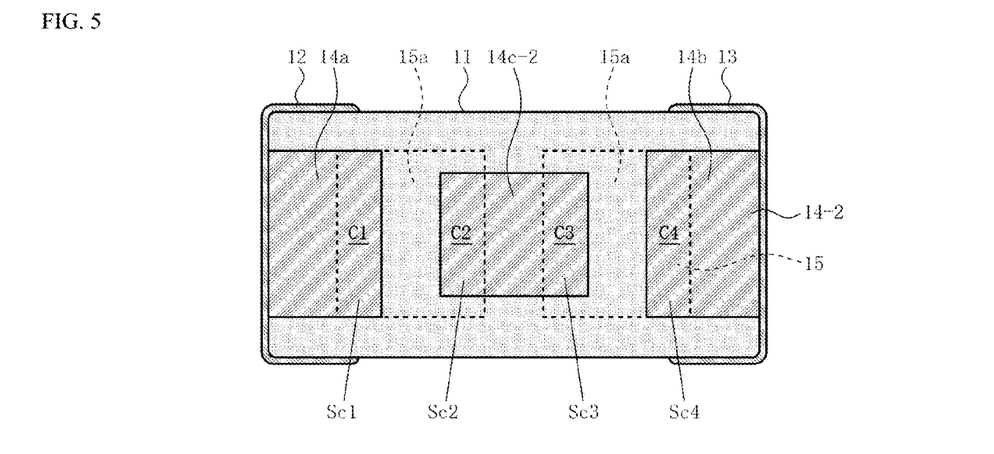
FIG. 5 is a drawing corresponding to FIG. 1B, illustrating the fourth example of variation of the multilayer ceramic capacitor shown in FIGS. 1A and 1B.

The first example of variation, shown in FIG. 2, uses second internal electrode layer groups 15-1, each constituted by two fourth electrode layers 15a-1 of trapezoidal profile, instead of the second internal electrode layer groups 15. Also, the second example of variation, shown in FIG. 3, uses second internal electrode layer groups 15-2, each constituted by two fourth electrode layers 15a-2 of triangular profile, instead of the second internal electrode layer groups 15. Furthermore, the third example of variation, shown in FIG. 4, uses first internal electrode layer groups 14-1, each constituted by a first electrode layer 14a of rectangular profile, a second electrode layer 14b of rectangular profile, and a third electrode layer 14c-1 of hexagonal profile, instead of the first internal electrode layer groups 14. Furthermore, the fourth example of variation, shown in FIG. 5, uses first internal electrode layer groups 14-2, each constituted by a first electrode layer 14a of rectangular profile, a second electrode layer 14b of rectangular profile, and a third electrode layer 14c-2 whose width is smaller than the first two layers, instead of the first internal electrode layer groups 14.

The first to fourth examples of variation shown in FIGS. 2 to 5 are useful in adjusting the facing areas Sc1 and Sc4 greater than the facing areas Sc2 and Sc3 when reducing the size of the multilayer ceramic capacitor 10, especially when shortening its length. In addition, the first example of variation can be combined with the third or fourth example of variation to adjust the facing areas as desired, or the second example of variation can be combined with the third or fourth example of variation to adjust the facing areas as desired.

<<Second Embodiment>>

Figure 6A:
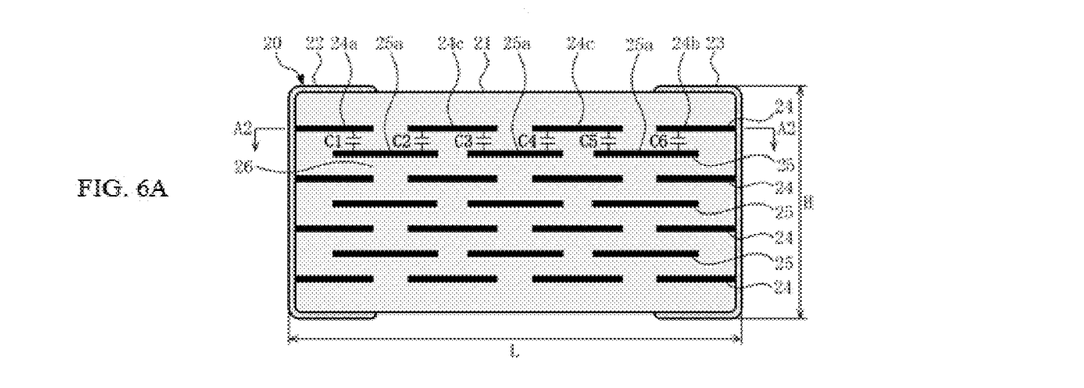
Figure 6B:
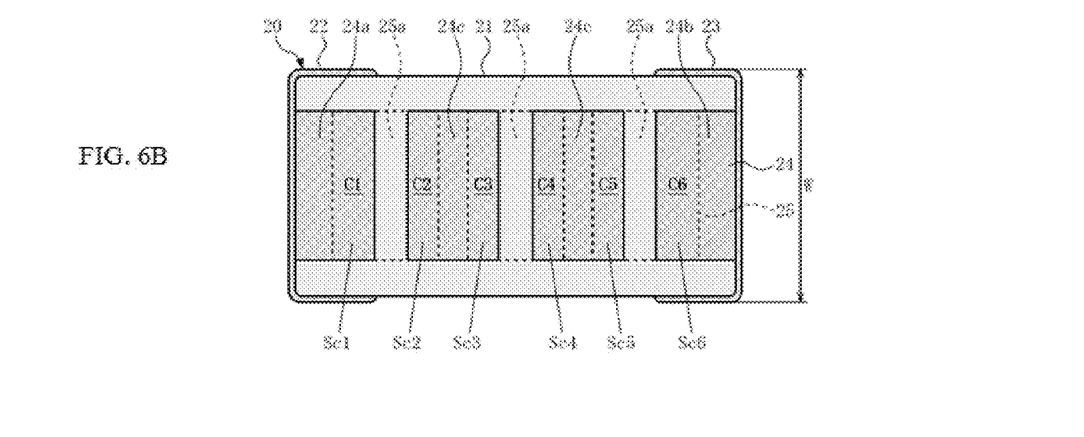
FIG. 6B is a lateral section view of the multilayer ceramic capacitor along line A2-A2 in FIG. 6A.

Next, a multilayer ceramic capacitor 20 pertaining to the second embodiment of the present invention is explained using FIGS. 6A and 6B.

This multilayer ceramic capacitor 20 is different from the multilayer ceramic capacitor 10 (refer to FIGS. 1A and 1B) in the following points:

Each first internal electrode layer group 24 is constituted by: a first electrode layer 24a of rectangular profile whose exposed part on one length-direction face (left face in the figure) of a capacitor body 21 is connected to a first external electrode 22; a second electrode layer 24b of rectangular profile whose exposed part on the other length-direction face (right face in the figure) of the capacitor body 21 is connected to a second external electrode 23; and two third electrode layers 24c of rectangular profile which are placed between the first electrode layer 24a and second electrode layer 24b in a manner not contacting either of them.

Each second internal electrode layer group 25 is constituted by three fourth electrode layers 25a of rectangular profile not connected to either the first external electrode 22 or the second external electrode 23, being placed in a manner not contacting each other.

It should be noted that six dielectric layers 26 have an equal thickness and the thickness of each dielectric layer 26 is roughly uniform. Also, the thickness and width of the first electrode layer 24a, thickness and width of the second electrode layer 24b, and thickness and width of each of the two third electrode layers 24c, are respectively equal. Furthermore, the three fourth electrode layers 25a each have an equal thickness and width, and the width of each fourth electrode layer 25a is equal to the width of the first electrode layer 24a, that of the second electrode layer 24b and that of each of the two third electrode layers 24c. Furthermore, among the three fourth electrode layers 25a, the length of the fourth electrode layer 25a at the center of the figure is shorter than the lengths of the other two fourth electrode layers 25a.

This multilayer ceramic capacitor 20 is constituted in such a way that six capacitive components C1 to C6 that are connected in series are formed between a first internal electrode layer group 24 and a second internal electrode layer group 25 adjacent to it. Of the six capacitive components C1 to C6, the facing area Sc1 that defines the capacitance value of the capacitive component C1 is equal to the facing area Sc6 that defines the capacitance value of the capacitive component C6. Also, the facing area Sc2 that defines the capacitance value of the capacitive component C2, facing area Sc3 that defines the capacitance value of the capacitive component C3, facing area Sc4 that defines the capacitance value of the capacitive component C4, and facing area Sc5 that defines the capacitance value of the capacitive component C5, are equal. However, the facing areas Sc1 and Sc6 are greater than the facing areas Sc2, Sc3, Sc4, and Sc5. This means that, among the six capacitive components C1 to C6, the facing area Sc1 that defines the capacitance value of the capacitive component C1 closest to the first external electrode 22 and the facing area Sc6 that defines the capacitance value of the capacitive component C6 closest to the second external electrode 23 are greater than the facing areas Sc2, Sc3, Sc4, and Sc5 that define the capacitance values of the remaining four capacitive components C2, C3, C4 and C5, respectively.

It should be noted that, while the facing area Sc1 is equal to the facing area Sc6 and the facing area Sc2, facing area Sc3, facing area Sc4 and facing area Sc5 are all equal in FIGS. 6A and 6B, the facing area Sc1 may be different from the facing area Sc6 and the facing area Sc2, facing area Sc3, facing area Sc4 and facing area Sc5 may be different from one another, so long as the facing areas Sc1 and Sc6 are greater than the facing areas Sc2, Sc3, Sc4, and Sc5.

The multilayer ceramic capacitor 20 can also achieve effects similar to those achievable with the multilayer ceramic capacitor 10. Also, with the multilayer ceramic capacitor 20, the facing areas can be adjusted as desired by changing the shape of the three fourth electrode layers 25a in the second internal electrode layer group 25 to the shape of the fourth electrode layer 15a-1 in the first example of variation, shown in FIG. 2, or to the shape of the fourth electrode layer 15a-2 in the second example of variation, shown in FIG. 3, or by changing the shape of the two third electrode layers 24c in the first internal electrode layer group 24 to the shape of the third electrode layer 14c-1 in the third example of variation, shown in FIG. 4, or to the shape of the third electrode layer 14c-2 in the fourth example of variation, shown in FIG. 5.

<<Third Embodiment>>

Figure 7A:
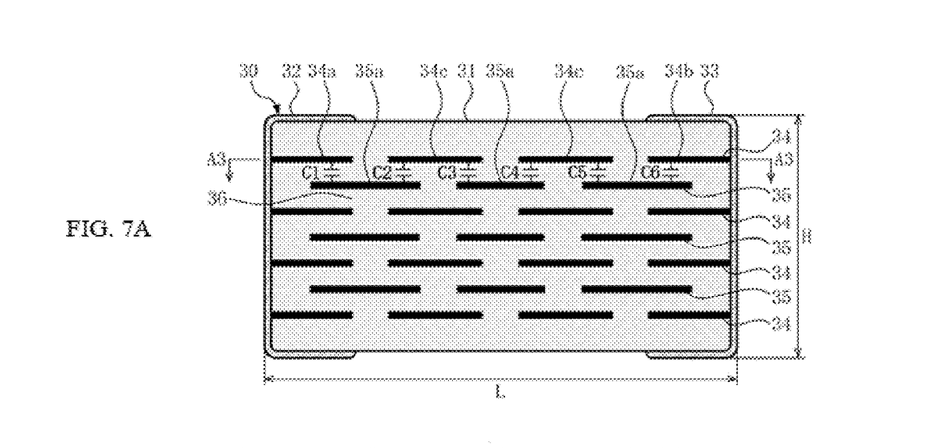
Figure 7B:
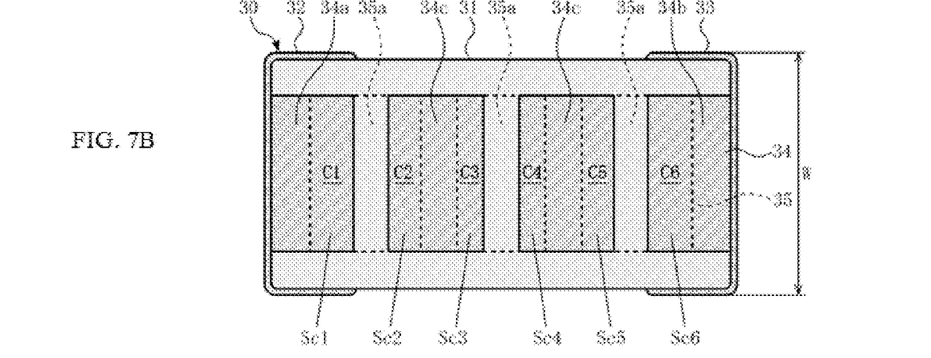
FIG. 7B is a lateral section view of the multilayer ceramic capacitor along line A3-A3 in FIG. 7A.

Next, a multilayer ceramic capacitor 30 pertaining to the third embodiment of the present invention is explained using FIGS. 7A and 7B.

This multilayer ceramic capacitor 30 is different from the multilayer ceramic capacitor 10 (refer to FIGS. 1A and 1B) in the following points:

Each first internal electrode layer group 34 is constituted by: a first electrode layer 34a of rectangular profile whose exposed part on one length-direction face (left face in the figure) of a capacitor body 31 is connected to a first external electrode 32; a second electrode layer 34b of rectangular profile whose exposed part on the other length-direction face (right face in the figure) of the capacitor body 31 is connected to a second external electrode 33; and two third electrode layers 34c of rectangular profile which are placed between the first electrode layer 34a and second electrode layer 34b in a manner not contacting either of them.

Each second internal electrode layer group 35 is constituted by three fourth electrode layers 35a of rectangular profile not connected to either the first external electrode 32 or the second external electrode 33, being placed in a manner not contacting each other.

It should be noted that six dielectric layers 36 have an equal thickness and the thickness of each dielectric layer 36 is roughly uniform. Also, the thickness and width of the first electrode layer 34a, thickness and width of the second electrode layer 34b, and thickness and width of each of the two third electrode layers 34c, are respectively equal. Furthermore, the three fourth electrode layers 35a each have an equal thickness and width, and the width of each fourth electrode layer 35a is equal to the width of the first electrode layer 34a, that of the second electrode layer 34b and that of each of the two third electrode layers 34c. Furthermore, among the three fourth electrode layers 35a, the length of the fourth electrode layer 35a at the center of the figure is shorter than the lengths of the other two fourth electrode layers 35a.

This multilayer ceramic capacitor 30 is constituted in such a way that six capacitive components C1 to C6 that are connected in series are formed between a first internal electrode layer group 34 and a second internal electrode layer group 35 adjacent to it. Of the six capacitive components C1 to C6, the facing area Sc1 that defines the capacitance value of the capacitive component C1 is equal to the facing area Sc6 that defines the capacitance value of the capacitive component C6. Also, the facing area Sc2 that defines the capacitance value of the capacitive component C2 is equal to the facing area Sc5 that defines the capacitance value of the capacitive component C5. Furthermore, the facing area Sc3 that defines the capacitance value of the capacitive component C3 is equal to the facing area Sc4 that defines the capacitance value of the capacitive component C4. However, the facing areas Sc1 and Sc6 are greater than the facing areas Sc2 and Sc5, while the facing areas Sc2 and Sc5 are greater than the facing areas Sc3 and Sc4. This means that, among the six capacitive components C1 to C6, the facing area Sc1 that defines the capacitance value of the capacitive component C1 closest to the first external electrode 22 and the facing area Sc6 that defines the capacitance value of the capacitive component C6 closest to the second external electrode 23 are greater than the facing areas Sc2, Sc3, Sc4, and Sc5 that define the capacitance values of the remaining four capacitive components C2, C3, C4, and C5, respectively.

It should be noted that, while the facing area Sc1 is equal to the facing area Sc6, the facing area Sc2 is equal to the facing areas Sc5, and the facing area Sc3 is equal to the facing area Sc4 in FIGS. 7A and 7B, the facing area Sc1 may be different from the facing area Sc6, the facing area Sc2 may be different from the facing area Sc5, and the facing area Sc3 may be different from the facing area Sc4, so long as the facing areas Sc1 and Sc6 are greater than the facing areas Sc2, Sc3, Sc4, and Sc5.

The multilayer ceramic capacitor 30 can also achieve effects similar to those achievable with the multilayer ceramic capacitor 10. Also, with the multilayer ceramic capacitor 30, the facing areas can be adjusted as desired by changing the shape of the three fourth electrode layers 35a in the second internal electrode layer group 35 to the shape of the fourth electrode layer 15a-1 in the first example of variation, shown in FIG. 2, or to the shape of the fourth electrode layer 15a-2 in the second example of variation, shown in FIG. 3, or by changing the shape of the two third electrode layers 34c in the first internal electrode layer group 34 to the shape of the third electrode layer 14c-1 in the third example of variation, shown in FIG. 4, or to the shape of the third electrode layer 14c-2 in the fourth example of variation, shown in FIG. 5.

<<Other Embodiments>>

FIGS. 1A and 1B show a multilayer ceramic capacitor 10 constituted in such a way that four capacitive components C1 to C4 that are connected in series are formed between a first internal electrode layer group 14 and a second internal electrode layer group 15 adjacent to it, FIGS. 6A and 6B show a multilayer ceramic capacitor 20 constituted in such a way that six capacitive components C1 to C6 that are connected in series are formed between a first internal electrode layer group 24 and a second internal electrode layer group 25 adjacent to it, and FIGS. 7A and 7 show a multilayer ceramic capacitor 30 constituted in such a way that six capacitive components C1 to C6 that are connected in series are formed between a first internal electrode layer group 34 and a second internal electrode layer group 35 adjacent to it; however, the present invention can still be applied to achieve effects similar to those mentioned above with a multilayer ceramic capacitor constituted in such a way that eight, ten, or more capacitive components that are connected in series are formed between a first internal electrode layer group and a second internal electrode layer group adjacent to it.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2016-014670, filed Jan. 28, 2016, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A multilayer ceramic capacitor constructed by stacking alternately, with dielectric layers placed in between:
 (i) first internal electrode layer groups, each formed on a same plane and comprising:
  a first electrode layer connected to a first external electrode;
  a second electrode layer connected to a second external electrode; and
  n number (n is an integer of 1 or greater) of third electrode layer(s) placed between the first electrode layer and the second electrode layer in a manner not contacting either of them; and
 (ii) second internal electrode layer groups, each formed on a same plane and comprising:
  n+1 number of fourth electrode layers not connected to either the first external electrode or the second external electrode, being placed in a manner not contacting each other;
 wherein m number (m=2(n+1)) of capacitive components are formed between the first internal electrode layer group and the second internal electrode layer group adjacent thereto, each capacitive component capacitively connecting the first internal electrode layer group and the second internal electrode layer group in series via a dielectric layer at an overlapping region where an electrode layer of the first internal electrode layer group and an electrode layer of the second internal electrode layer group face each other;
 wherein, among the m number of capacitive components, a facing area of the overlapping region that defines a capacitance value of one capacitive component closest to an end of the first external electrode facing the second external electrode, and a facing area of the overlapping region that defines a capacitance value of one capacitive component closest to an end of the second external electrode facing the first external electrode, are each greater than a facing area of the overlapping region that defines a capacitance value of any one of remaining capacitive components.

2. A multilayer ceramic capacitor according to claim 1, wherein the facing area of the overlapping region that defines the capacitance value of one capacitive component closest to the first external electrode is equal to the facing area of the overlapping region that defines the capacitance value of one capacitive component closest to the second external electrode.

3. A multilayer ceramic capacitor according to claim 1, wherein each third electrode layer has a shape which is the same as a shape of each fourth electrode layer as viewed from above.

4. A multilayer ceramic capacitor according to claim 1, wherein each third electrode layer has a shape which is different from a shape of each fourth electrode layer as viewed from above.

5. A multilayer ceramic capacitor according to claim 1, wherein n is an integer of 2 or greater, and m is an even number of 6 or greater, and
 when the capacitive components are referred to as $C(1)$ to $C(m)$, respectively, from the first external electrode side toward the second external electrode side, and facing areas of the overlapping regions that define capacitance values of $C(1)$ to $C(m)$, respectively, are referred to as $Sc(1)$ to $Sc(m)$, respectively,
 a relationship of $Sc(1) > Sc(2) > \ldots > Sc(m/2)$, and a relationship of $Sc(m) > \ldots > Sc(m/2+2) > Sc(m/2 +1)$, are satisfied.

6. A multilayer ceramic capacitor according to claim 5, wherein m is 6, and $Sc(1)$, $Sc(2)$, and $Sc(3)$ are equivalent to $Sc(6)$, $Sc(5)$, and $Sc(4)$, respectively.

* * * * *